US008535783B2

(12) United States Patent
Lutjen et al.

(10) Patent No.: US 8,535,783 B2
(45) Date of Patent: Sep. 17, 2013

(54) CERAMIC COATING SYSTEMS AND METHODS

(75) Inventors: Paul M. Lutjen, Kennebunkport, ME (US); Christopher W. Strock, Kennebunkport, ME (US)

(73) Assignee: United Technologies Corporation, Hartford, CT (US)

( * ) Notice: Subject to any disclaimer, the term of this patent is extended or adjusted under 35 U.S.C. 154(b) by 412 days.

(21) Appl. No.: 12/796,413

(22) Filed: Jun. 8, 2010

(65) Prior Publication Data

US 2011/0300342 A1 Dec. 8, 2011

(51) Int. Cl.
*B32B 18/00* (2006.01)
*B32B 15/04* (2006.01)

(52) U.S. Cl.
USPC ........... 428/173; 428/209; 428/210; 428/600; 428/609; 428/632; 428/633

(58) Field of Classification Search
USPC ................. 428/172, 173, 209, 210, 600, 609, 428/632, 633; 60/753; 415/173.1
See application file for complete search history.

(56) References Cited

U.S. PATENT DOCUMENTS

| | | | | |
|---|---|---|---|---|
| 2,490,548 | A | 12/1949 | Schultz | |
| 4,861,618 | A | 8/1989 | Vine et al. | |
| 5,419,039 | A | 5/1995 | Auxier et al. | |
| 6,098,397 | A | 8/2000 | Glezer et al. | |
| 7,387,758 | B2 | 6/2008 | Merrill et al. | |
| 2002/0146541 | A1 | 10/2002 | Fried | |
| 2002/0197155 | A1* | 12/2002 | Howard et al. | 415/173.4 |
| 2003/0170119 | A1 | 9/2003 | Fried | |
| 2007/0224359 | A1 | 9/2007 | Burin et al. | |
| 2008/0044662 | A1* | 2/2008 | Schlichting et al. | 428/426 |
| 2009/0136345 | A1 | 5/2009 | Tholen et al. | |
| 2009/0324401 | A1 | 12/2009 | Calla | |

FOREIGN PATENT DOCUMENTS

| | | | |
|---|---|---|---|
| DE | 102005050873 | A1 | 4/2007 |
| DE | 102009003861 | A1 | 11/2009 |
| EP | 1247874 | A1 | 10/2002 |
| EP | 1253294 | A2 | 10/2002 |
| EP | 1900840 | A2 | 3/2008 |
| EP | 2034132 | A2 | 3/2009 |
| EP | 2275645 | A2 | 1/2011 |
| WO | 2004043691 | A1 | 5/2004 |

OTHER PUBLICATIONS

Singapore Written Opinion for SG Patent Application No. 201101793-6, dated Jun. 19, 2012.

European Search Report for EP Patent Application 11250419.6, dated Sep. 5, 2011.

* cited by examiner

*Primary Examiner* — Maria Veronica Ewald
*Assistant Examiner* — Joanna Pleszczynska
(74) *Attorney, Agent, or Firm* — Bachman & LaPointe, P.C.

(57) ABSTRACT

An article has a metallic substrate. The substrate has a first surface region and a plurality of blind recesses along the first surface region. The substrate has perimeter lips at the openings of the plurality of recesses and extending partially over the respective associated recesses. A ceramic coating is along the first surface region.

16 Claims, 5 Drawing Sheets

CERAMIC COATING SYSTEMS AND METHODS

BACKGROUND

The disclosure relates to ceramic coatings. More particularly, the disclosure relates to substrate preparation for ceramic coatings.

Components that are exposed to high temperatures, such as a component within a gas turbine engine, typically include protective coatings. For example, components such as turbine blades, turbine vanes, blade outer air seals (BOAS), and compressor components (e.g., floatwall panels) typically include one or more coating layers that function to protect the component from erosion, oxidation, corrosion or the like to thereby enhance component durability and maintain efficient operation of the engine.

As an example, some conventional turbine blade outer air seals include an abradable ceramic coating that contacts tips of the turbine blades such that the blades abrade the coating upon operation of the engine. The abrasion between the outer air seal and the blade tips provide a minimum clearance between these components such that gas flow around the tips of the blades is reduced to thereby maintain engine efficiency. Over time, internal stresses can develop in the protective coating to make the coating vulnerable to erosion and spalling. The outer air seal may then need to be replaced or refurbished after a period of use.

Similarly, the turbine blades may have an abrasive tip coating which properties are chosen to abrade the BOAS abradable coatings.

SUMMARY

One aspect of the disclosure involves an article having a metallic substrate. The substrate has a first surface region and a plurality of blind recesses along the first surface region. The substrate has perimeter lips at the openings of the plurality of recesses and extending partially over the respective associated recesses. A ceramic coating is along the first surface region.

In various implementations, the article may be a gas turbine engine component (e.g., a blade outer airseal or a combustor floatwall panel). A substrate may be one of a casting and an outer layer of a multi-layer metal laminate. The coating may comprise a stabilized zirconia (e.g., gadolinia-stabilized zirconia). An MCrAlY bondcoat may be between the coating and the substrate. The recesses may be arranged in a regular pattern. The recesses may have a transverse dimension at the lip of 85-98% of a transverse dimension below the lip.

The article may be manufactured by a method comprising indenting the first surface region to form the indentations. The indenting raises portions of the first surface region at perimeters of the indentations. The raised portions are deformed partially into the indentations so as to form the lips. The coating is applied to the substrate.

In various implementations, the deforming may comprise a pressing.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
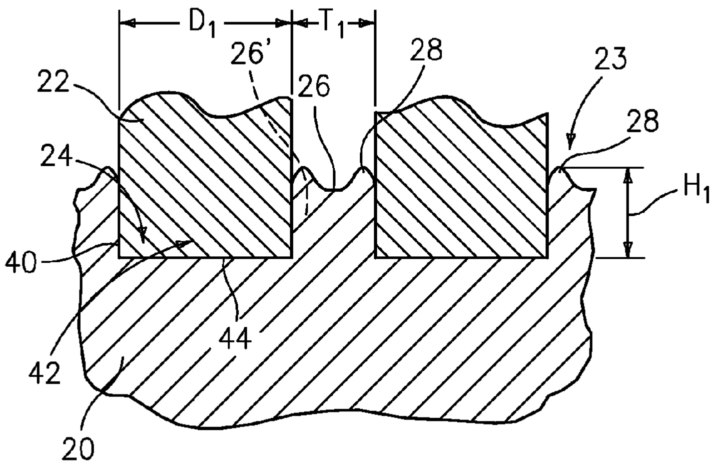
FIG. 1 is a partial sectional view of a substrate and indenter during indentation.

An exemplary indentation process starts with a metal substrate. An exemplary substrate is a casting or machining (e.g., of a nickel- or cobalt-based superalloy for a gas turbine engine component such as an airseal or a combustor component). Alternative substrates may be roll or other sheet material for use in such components. The substrate 20 (FIG. 1) is placed in an indenting press and the indenters 22 are pressed into a first surface region 23 of the substrate creating indentations 24 (which form blind recesses in the substrate). The indenting causes material flow outward from the indentations into areas therebetween so as to raise the surface 26 above the initial level 26'. The distribution of any raising of the surface 26 will depend upon the distribution of the indenters. If the indenters are sufficiently far away, then at least portions of the surface 26 between the indenters will not be raised. This material flow may create especially elevated zones 28 comprising raised lips immediately around the indentations. The indenters may then be extracted.

Figure 3:
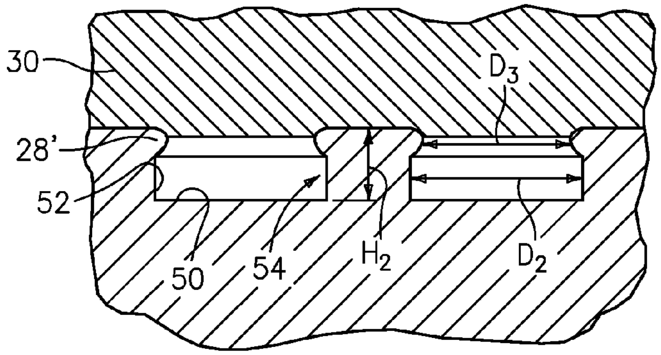
FIG. 3 is a partial view of a surface region of the coined substrate.

After the indenting, the substrate may be transferred to a different press. In the exemplary implementation, one or more second dies 30 (FIG. 3) in one or more stages deform (coin) the raised lips 28 over/into/across the indentations. This may leave the lips (now shown as 28') deformed/pressed/coined flush or subflush to the remainder of the adjacent surface or may still leave the lips 28' merely less proud of the adjacent area.

Each exemplary indenter 22 is cylindrical (e.g., an outer surface 40 along a lower/distal portion 42 is cylindrical (e.g., a right circular cylinder, although other cross-sections and varying cross-sections are possible)). Each indenter extends upward/outward from a distal/lower face 44. An exemplary indenter diameter $D_1$ along the cylindrical portion is essentially identical to the diameter $D_2$ of the indentation it leaves. The exemplary indentation base 50 is essentially flat, meeting the adjacent lower portion 52 of the indentation sidewall 54 at a right angle. An exemplary pre-coining indentation depth or height (to the apexes of the lips) is $H_1$ (FIG. 1). Exemplary $D_1$ and $D_2$ are about 60 mil (1.5 mm), more broadly, 1.0-2.5 mm or 0.5-4.0 mm. An exemplary post-coining indentation depth or height is $H_2$. An exemplary diameter at the coined lip 28' is $D_3$. Exemplary $D_3$ is less than 98% of $D_2$, more narrowly, 85-98% or 88-95%. An exemplary protrusion $\Delta R$, where $\Delta R=(D_2-D_3)/2$ (for a circular indentation) of the lip is 1-7.5% of $D_2$, more narrowly 2-5% or 15-115 micrometers, more narrowly, 15-65 micrometers. For example, when $D_2=1.5$ mm, an exemplary protrusion is 0.75 mm. Alternatively, an exemplary $\Delta R$ might be 2-15% of a local radius (e.g., 2-15% of 0.5 $D_2$). Exemplary $H_1$ is 20 mil (0.5 mm), more broadly, 0.2-1.0 mm or 0.1-2.0 mm. An exemplary coining depth $H_1$-$H_2$ ($\Delta H$) is 15-115 micrometers, more narrowly, 15-65 micrometers. Alternatively, exemplary $\Delta H$ is 5-20% of $H_1$. An exemplary web thickness $T_1$ (FIG. 1) between adjacent indentations is 20 mil (0.5 mm), more broadly, 0.1-4.0 mm or 20-200% of $D_1$, more narrowly, 30-100%.

Figure 2:
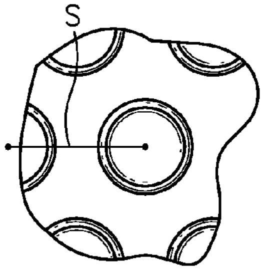
FIG. 2 is a partial sectional view of a substrate and die during a post-indentation coining.

The indentations may be arranged in one or more regular arrays. For example, depending upon the nature of the particular article (e.g., the BOAS) local curvature may require slight deviations from an exact regular pattern/array and larger surface features may interrupt arrays or separate distinct arrays. An exemplary regular pattern/array of the indentations is a two-dimensional (2D) hexagonal array (FIG. 2). In such an array, an exemplary on-center spacing S is 130-250% of $D_2$.

Alternative indentation planforms or cross-sections include polygonal (e.g., triangular, square, hexagonal) indentations and annular indentations. Their respective transverse dimensions would correspond to the diameters above. The $\Delta R$ of an annular indentation would correspond to the diameter of the circular indentation.

With roll-formed sheet metal as the substrate, the pressing and coining may be performed as continuous processes (e.g., via rollers). The resulting sheet material may then be laminated to other layers and further formed into the shape of the ultimate component (e.g., for an exemplary floatwall, various features may be machined, mounting features may be secured to the laminate, and the laminate may be deformed to the frustoconical segment shape).

Coating may be via a multi-stage process appropriate to the particular end use. This may involve applying a mere thermal barrier coating (e.g., on the combustor panel). On a BOAS segment it may involve an abrasive coating (for abrading blade tips) or abradable coating (to be abraded by blade tips).

An exemplary coating process is a multi-stage process. The exemplary process includes depositing a bondcoat and then depositing one or more additional coating layers (e.g., ceramic). An exemplary bondcoat is an MCrAlY (where M is at least one of nickel, cobalt, and iron) deposited via high velocity oxy-fuel (HVOF) deposition. An exemplary ceramic abradable coating comprises one or more stabilized zirconia layers (e.g., a GSZ and/or a yttria stabilized zirconia (YSZ)) via air plasma spray (APS).

Figure 4:
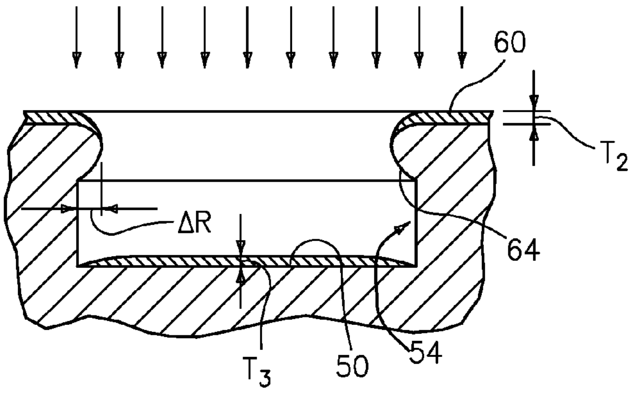
FIG. 4 is a partial sectional view of the substrate after a first stage of coating.

During the spraying process, the protrusion of the lips above the lower portion of the indentation sidewall tends to shield the sidewall and the peripheral portion of the base. The result (FIG. 4) is a reduction in the amount of coating available to bridge the junction of the sidewall and the base (the corner of the cross-section). FIG. 4 shows the bondcoat 60 as having a thickness $T_2$ along the raised, flattened surface regions between the indentations. Approaching the indentation, the coating tapers around the lip leaving the underside 64 of the lip and the indentation sidewall 54 therebelow largely uncoated. Similarly, in a central region of the indentation base 50, the thickness is shown as $T_3$ which may be similar to (e.g., slightly less than) $T_2$. Near the periphery of the base 50, the coating tapers off in thickness. Thus, in distinction to a bridging situation, the coating may taper so as to thin toward the periphery to the base rather than thicken toward the periphery of the base.

Figure 5:
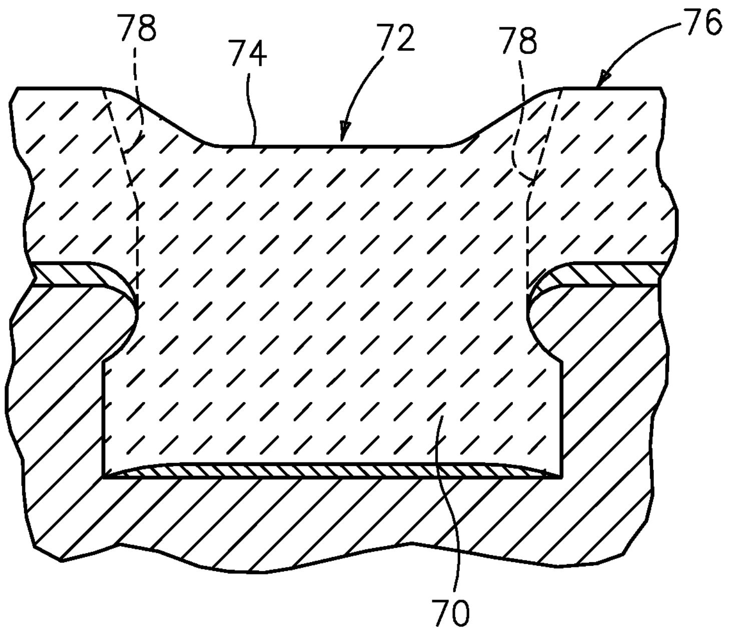
FIG. 5 is a partial sectional view of the substrate after a second stage of coating.
Figure 6:
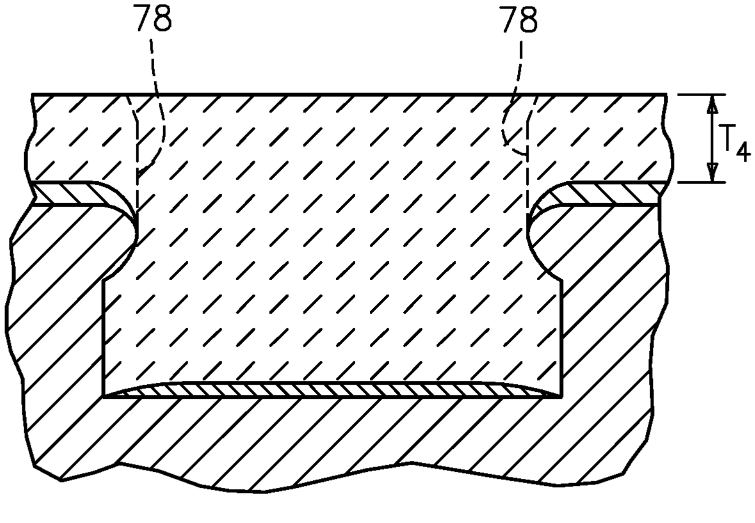
FIG. 6 is a partial sectional view of the substrate after smoothing.

FIG. 5 shows the coated substrate after application of the ceramic material 70. In the exemplary implementation, the as-applied ceramic material 70 more than fills the indentations. The indentations are, however, associated with relatively recessed regions 72 in the coating surface 74 which may be interspersed with relatively elevated regions 76. A subsequent machining process may flatten the coating by removing the elevated areas (FIG. 6). This may involve removing material from both the elevated and recessed regions to smooth/level the coating (e.g., close to accommodating overall curvature of the substrate such as the original pre-indentation shape of a cast or machined substrate). An exemplary peak bondcoat thickness $T_2$ is 5-8 mil (0.13-0.20 mm), more broadly, 0.05-0.50 mm. An exemplary final thickness $T_4$ of the ceramic material away from the indentations is 5-40 mil (0.13-1.0 mm), more broadly, 0.05-2.0 mm. FIG. 5 further shows faults 78 associated with the indentation and extending outward through the coating. The faults have the tendency to provide some accommodation of differential thermal expansion and interrupt crack propagation.

In general, the segmentation of the coating provided by the indentations helps the coating accommodate differential thermal expansion (e.g., of the coating and substrate) to avoid spalling. The lips, by reducing bridging across the indentations help. With substantial bridging, the accommodation of differential thermal expansion is partially compromised.

Figure 7:
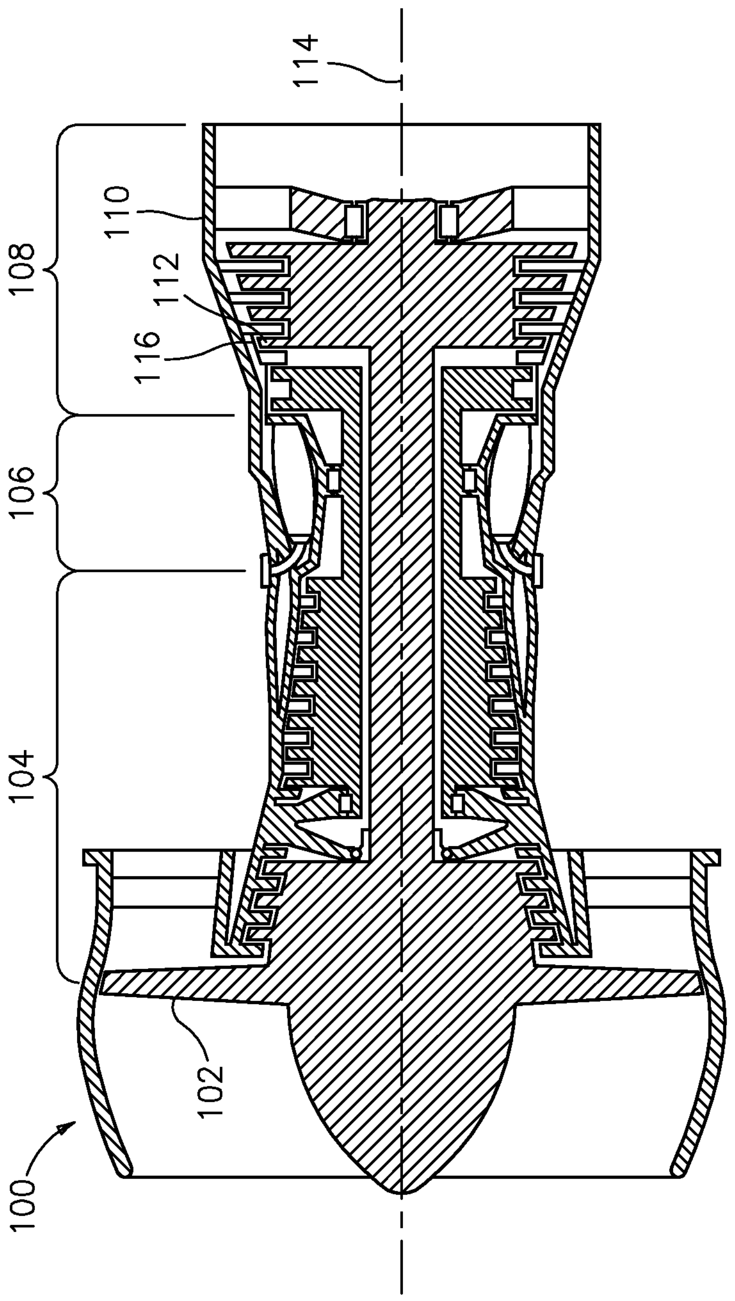
FIG. 7 is a partially schematicized central longitudinal sectional view of a turbine engine.

FIG. 7 shows a turbine engine 100 (e.g., a turbofan) having a fan 102, one or more compressor sections 104, a combustor 106 and one or more turbine sections 108, and a case 110. The exemplary two-spool engine has high speed/pressure compressor and turbine sections on the high speed spool and low speed/pressure compressor and turbine sections on the low speed spool. FIG. 7 also shows a blade 112 in the first blade stage of the low-pressure turbine. The blade stages rotate about the engine centerline or central longitudinal axis 114. Tips of the blade stage move in close facing proximity to a circumferential array 116 of BOAS segments.

Figure 8:
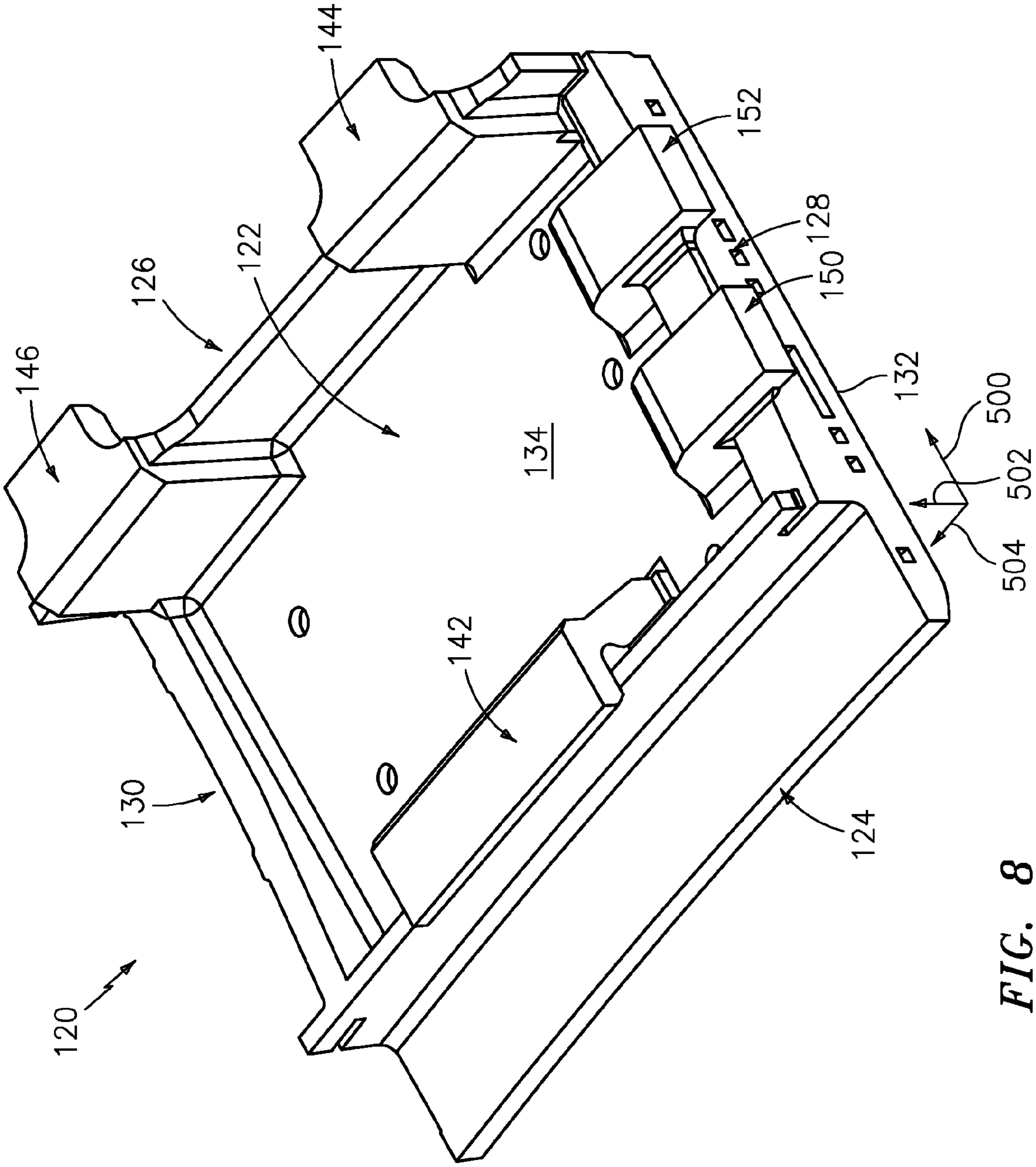
FIG. 8 is a view of a blade outer airseal.

FIG. 8 shows a blade outer air seal (BOAS) segment 120. Relative to an installed condition, a downstream/aftward direction 500, radial (outward) direction 502, and circumferential direction 504 are shown. The BOAS has a main body portion 122 having a leading/upstream/forward end 124 and a trailing/downstream/aft end 126. The body has first and second circumferential ends or matefaces 128 and 130. The body has an ID face 132 (along which the indentations may be formed) and an OD face 134. To mount the BOAS to environmental structure (e.g., a main portion of the case), the exemplary BOAS has a plurality of mounting hooks. The exemplary BOAS has a single central forward mounting hook 142 having a forwardly-projecting distal portion recessed aft of the forward end 124. The exemplary BOAS has a pair of first and second aft hooks 144 and 146 having rearwardly-projecting distal portions protruding aft beyond the aft end 126.

The assembled ID faces of the circumferential array of BOAS segments thus locally bound an outboard extreme of the core flowpath through the engine. The BOAS 122 may have features for interlocking the array. Exemplary features include finger and shiplap joints. The exemplary BOAS 122 has a pair of fore and aft fingers 150 and 152 projecting from the first circumferential end 128 and which, when assembled, are positioned radially outboard of the second circumferential end 130 of the adjacent BOAS.

Figure 9:
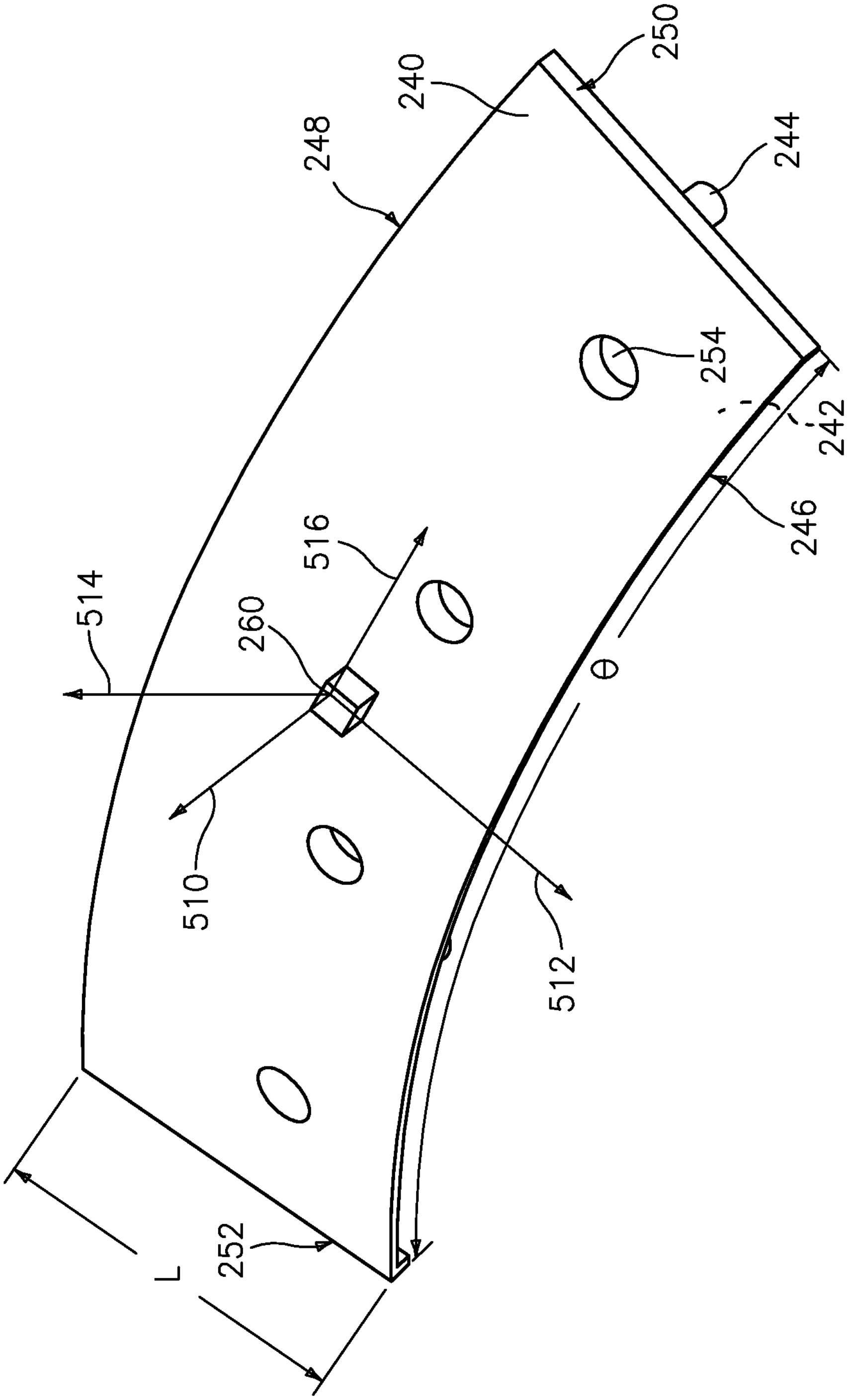
FIG. 9 is a view of a combustor floatwall panel.

The exemplary combustor is an annular combustor having inboard and outboard walls each having an outer shell and an inner heat shield. Each exemplary wall heat shield is made of a longitudinal and circumferential array of panels as may be the shells. In exemplary combustors there are two to six longitudinal rings of six to twenty heat shield panels (floatwall panels). Each panel (FIG. 9) has a generally inner (facing the combustor interior) surface 240 and a generally outer surface 242. Mounting studs 244 or other features may extend from the outer surface 242 to secure the panel to the adjacent shell. The panel extends between a leading edge 246 and a trailing edge 248 and between first and second lateral (circumferential) edges 250 and 252. The panel may have one or more arrays of process air cooling holes 254 between the inner and outer surfaces. The indented surface may be the inner surface 240. The panel is shown having a circumferential span θ and a cone-wise length L. At a center 260 of the panel, a surface normal is labeled 510, a cone-wise direction 512 normal thereto, a circumferential direction 516 and a radial direction 514.

One or more embodiments have been described. Nevertheless, it will be understood that various modifications may be made. For example, the nature of the particular article (e.g., BOAS or floatwall panel) may influence details of any particular implementation. Accordingly, other embodiments are within the scope of the following claims.

What is claimed is:

1. An article comprising:
a metallic substrate having:
a first surface region;
a plurality of blind recesses along the first surface region; and
for each of the blind recesses, an associated perimeter lip at an opening of the recess and extending partially over and circumscribing the recess; and
a ceramic coating along the first surface region.

2. The article of claim 1 being a gas turbine engine component.

3. The article of claim 1 wherein:
the substrate is one of:
a casting; and
an outer layer of a multi-layer metal laminate.

4. The article of claim 1 being one of:
a blade outer airseal; and
a combustor floatwall panel.

5. The article of claim 1 wherein:
the coating comprises a gadolinia-stabilized zirconia.

6. The article of claim 1 wherein:
the coating comprises a stabilized zirconia; and
an MCrAlY bondcoat is between the substrate and the stabilized zirconia.

7. The article of claim 1 further comprising:
a bondcoat at least along areas of the first surface region away from the recesses and along bases of the respective recesses.

8. The article of claim 7 wherein:
the bondcoat tapers in thickness along the bases of the respective indentations, thinning toward the peripheries of the respective indentations.

9. The article of claim 1 wherein:
the recesses are arranged in a regular pattern.

10. The article of claim 1, wherein:
the recesses have a transverse dimension at the lip of 85-98% of a transverse dimension below the lip.

11. The article of claim 1 wherein:
the recesses are circular in planform.

12. The article of claim 1 wherein:
each of said recesses has a single said associated perimeter lip.

13. The article of claim 1 wherein:
the recesses are separate from each other.

14. The article of claim 1 wherein:
the recesses are indentations.

15. The article of claim 1 wherein:
faults associated with the respective recesses extend outward through the ceramic coating.

16. The article of claim 15 wherein:
the faults provide a combination of differential thermal expansion and interruption of crack propagation.

* * * * *